W. C. D. BODY.
SAFETY ATTACHMENT FOR CARS.
APPLICATION FILED OCT. 10, 1910.
983,022.
Patented Jan. 31, 1911.
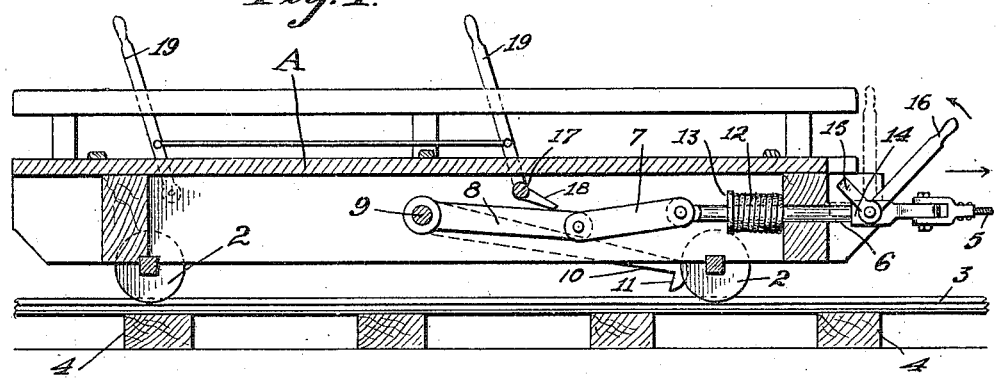
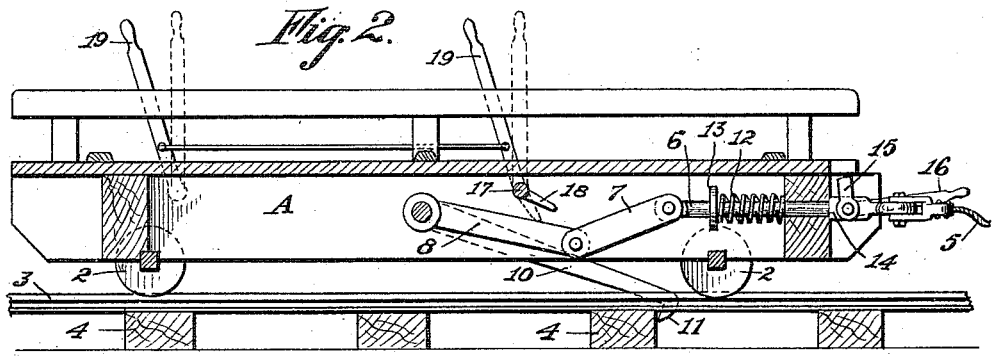
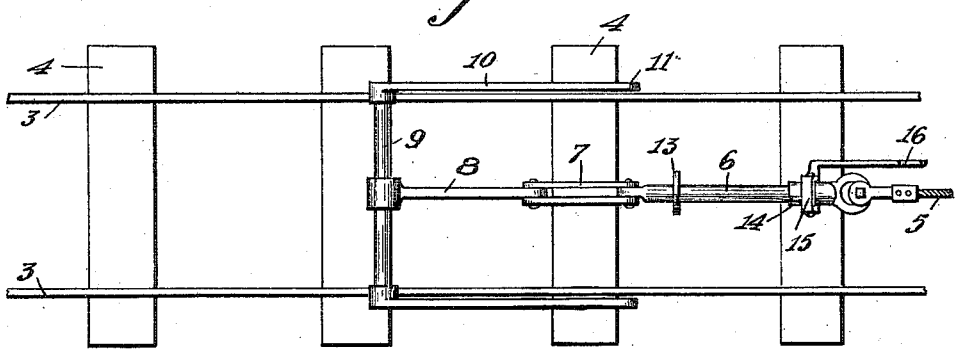
WITNESSES;
INVENTOR
WILLIAM C.D. BODY
BY Geo. H. Strong.
HIS ATTORNEY.

UNITED STATES PATENT OFFICE.

WILLIAM C. D. BODY, OF GRASS VALLEY, CALIFORNIA.

SAFETY ATTACHMENT FOR CARS.

983,022.  Specification of Letters Patent.  Patented Jan. 31, 1911.

Application filed October 10, 1910. Serial No. 586,260.

*To all whom it may concern:*

Be it known that I, WILLIAM C. D. BODY, citizen of the United States, residing at Grass Valley, in the county of Nevada and State of California, have invented new and useful Improvements in Safety Attachments for Cars, of which the following is a specification.

This invention relates to a braking device and particularly pertains to an automatic safety brake for cable operated tram cars, mining skeps, log cars and the like.

It is the object of this invention to provide a safety brake for cable operated vehicles which is simple in construction and which is adapted to be operated automatically or manually.

A further object is to provide a means by which a cable drawn car may be quickly brought to a stop in event the cable slips or breaks, thus preventing the running away of the car and lessening the possibility of accidents resulting in the loss of life and property.

Another object is to provide means by which the car may be held and retained in a secure stationary position on a heavy grade.

This invention consists of the parts and construction and combination of parts as hereinafter more fully described and claimed having reference to the accompanying drawings, in which—

Figure 1 is a longitudinal section of a car body showing the invention as applied. Fig. 2 is a similar view showing the automatic safety brake in its operative position. Fig. 3 is a plan view of the device with the car body removed.

In the drawings, A, represents the body of a car which may be of any suitable type or construction, and is provided with running gear or wheels 2 adapted to travel on a tramway or track 3, supported upon sleepers or ties 4. The motive power of the car A consists of a draw cable 5 which is wound upon a drum not shown, and operated by any suitable engine or motor in the manner common to cable drawn cars such as are employed in mining and lumbering operations.

The cable 5 is connected to a draft bar 6 which is slidably mounted on the forward end of the frame of the car A, and is disposed longitudinally and centrally thereof. The inner end of the bar 6 is pivoted to a link 7 which in turn is pivoted to an arm 8 mounted on a rock-shaft 9 disposed transversely across the underside of the car A, about midway of its length. Each end of the rock-shaft 9 projects through the side frame of the car A and has rigidly secured thereon a forwardly extending arm 10 which terminates at its outer end in a downwardly projecting hook 11. The arms 10 are constructed sufficiently long to extend forward to a point approximate the front wheels 2, the hooked portions 11 being disposed near the outer face of the wheel and adjacent the outer edge of the rails 3.

A stiff spiral spring 12 is mounted on the bar 6 and is adapted to bear between a fixed member on the frame of the car A and a collar 13 on the bar 6 with sufficient tension to insure the bar 6 normally remaining in its innermost position, as shown in Fig. 2. In this position the hooks 11 on the arms 10 will be so disposed as to allow them to engage the ties or sleepers 4 to prevent the backward movement of the car A. A shoulder 14 is formed on the forward end of the bar 6 to limit its rearward movement.

The operation of the parts of the invention so far described is as follows: Assuming the car A to be standing still and the cable 5 in a slacked condition and the hooks 11 engaged with a sleeper 4, as shown in Fig. 2. To move the car A forward, a pull is exerted upon the cable 5 which pulls the bar 6 outward in opposition to the spring 12 which by virtue of the link 7 and arm 8 rocks the shaft 9 so as to lift the arms 10 and hooks 11 clear of the sleepers 4 and tracks 3, and admits of the car being moved forward, as desired.

Cars of this nature being usually operated on a grade so as to travel backward by gravity, it will be seen that the bar 6 must be kept in its forwardmost position to keep the hooks 11 out of contact with the ties 4 while the car is traveling. This may be accomplished by allowing the weight of the moving car to keep the cable 5 taut with sufficient strain or pull on the bar 6 to retain the bar in its outermost position, or a separate device may be employed which can be operated from the car A and which consists of a pivoted wedge 15. This wedge 15 is mounted on the forward end of the rod 6 and is provided with a hand lever 16 by means of which it may be rocked on its bearing so as to throw the wedge in or out of contact with the frame of the car A. By pulling the lever 16 backward the wedge will bear against the frame of the car at a point adjacent the rod 6 and thus acts to oppose the spring 12 and the weight of the arms 10 and prevents the backward movement of the bar 6, thus holding the hooks 11 clear of the sleepers 4.

As it may be necessary to throw the hooks 11 into engagement with the sleepers 4 from a point on the car a means is provided for this purpose which consists of a shaft 17 disposed laterally across the underside of the car above the arm 8. A shoe or cam 18 is mounted on the shaft 17 which is adapted to contact the top edge of the arm 8 to bear down on the latter when the shaft 17 is rocked. This is accomplished by means of a hand lever 19 mounted on the end of the shaft 17 and extending upward alongside of the car A.

From the foregoing it will be seen that in event the cable 5 breaks while pulling the car forward, or lowering it down grade, the spring 12 will cause the hooked arms 10 to quickly drop and engage the sleepers 4 with the hooks 11 and thus prevent further backward movement of the car.

The hooks 11 are disposed near the forward wheels 2 so as to prevent the car from being derailed when the hooks suddenly engage a sleeper 4.

Having thus described my invention, what I claim and desire to secure by Letters Patent is—

1. A safety braking device for cars drawn by a cable, comprising a reciprocal rod mounted on the car and attached to the cable, a rock shaft adapted to be actuated by said reciprocal rod and engaging members mounted on said rock shaft adapted to engage fixed points in a roadbed.

2. A braking device for cars pulled by a cable, comprising a reciprocal rod mounted on the car and attached to the cable, a rock shaft adapted to be actuated through a linked connection by said reciprocal rod, hooked members mounted on said rock shaft adapted to be engaged and disengaged from fixed points in a roadbed by the operation of said reciprocal bar.

3. In a cable drawn car, a safety brake attachment comprising hooked members adapted to engage fixed points in a roadbed, a rock shaft on which said members are mounted, a reciprocal rod and a jointed link connection between the same and said rock shaft, and means for reciprocating said rod to actuate the hooked engaging members.

4. In a cable drawn car, a safety brake attachment comprising hooked members adapted to engage fixed points in a roadbed, a rock shaft on which said members are mounted, a reciprocal rod linkedly connected to said rock shaft, means for reciprocating said rod to actuate the hooked engaging members, and separate means for locking the hooked members in or out of engagement with the fixed points in the roadbed.

5. The combination with a car, of hooked arms, fulcrumed links by which the hooks are carried, a spring by which the hooks are made to engage fixed stops, means carried by the car to overcome the tension of the spring and hold the hooks clear of the stops, and other means to depress said hooks into operative engagement with the stops.

In testimony whereof I have hereunto set my hand in the presence of two subscribing witnesses.

WILLIAM C. D. BODY.

Witnesses:
JOHN H. HERRING,
KATHERINE V. DOUGERY.